Dec. 14, 1954     T. A. ÖDMAN     2,696,743
ADJUSTABLE GEAR MECHANISM

Filed March 6, 1951     2 Sheets-Sheet 1

Inventor:
Tor Axl Ödman
By Jarvis C. Marble
His Attorney

Dec. 14, 1954     T. A. ÖDMAN     2,696,743
ADJUSTABLE GEAR MECHANISM
Filed March 6, 1951     2 Sheets-Sheet 2

United States Patent Office 2,696,743
Patented Dec. 14, 1954

2,696,743
ADJUSTABLE GEAR MECHANISM

Tor Axel Ödman, Stockholm, Sweden, assignor, by mesne assignments, to Jarvis C. Marble, New York, N. Y., Leslie M. Merrill, Westfield, N. J., and Percy H. Batten, Racine, Wis., as trustees Application March 6, 1951, Serial No. 214,168

Claims priority, application Sweden March 20, 1950

3 Claims. (Cl. 74—399)

The present invention has for its object a device for eliminating difficulties in the operation of driving gears caused by changes in the dimensions of the wheels due to temperature variations, or due to manufacturing defects. More specifically the invention relates to rotors of regenerative heat exchanges provided with peripheral drive.

For driving such rotors two different systems are usually used, namely so called central drive and peripheral drive. With the first mentioned system the rotor is driven by power supplied to the rotor shaft via a speed reduction gear. With central drive the deformation of the rotor in operation does not influence the proper functioning of the driving gear, but the forces to be transmitted by the gear wheels will be very great as well as the stresses in the central members of the rotor. Accordingly the device will be relatively heavy and expensive. On the other hand, peripheral drive, the gearing mechanism of which principally consists of a gear rim provided around the rotor and a gear wheel mounted on the rotor housing, produces smaller stresses in the rotor. Moreover, the driving device is more accessible for control and may be located so that it is less exposed to high temperatures. However, this system involves great disadvantages, the greatest of which is related to the deformation of the rotor.

In rotary preheaters the continuous thermal expansion of the rotor is, of course, dependent on the load and also on the temperature. In some cases a certain warping or ovality of the rotor may also arise causing troubles in the gear drive with peripheral drive. The difference between the rotor radius at start and at high load is considerable and varies normally from 10 up to 20 mm. A defective machining of the gear rim of the rotor will also increase the faults in the gear drive.

With a rigidly mounted pinion the tooth clearance will therefore vary considerably depending on the thermal expansion of the rotor which expansion is not followed by a corresponding expansion of the frame, and also because of ovality of the gear rim depending on the difficulty to produce a geometrically correct circular shape of a gear rim having a relatively great diameter.

Either involute or cycloid profile may be used, but even if the involute profile theoretically permits a variable tooth clearance to a great extent, the deformation of the rotor or the rim, however, is generally so large that the gear must be made with an inconveniently great modulus from the view-point of manufacturing, for example. Furthermore, with cycloid profiles the tooth clearance must be constant for obtaining a satisfactory operation of the gear. In the present case the distance between axes because of different temperatures in the stationary frame at various operating conditions is variable to a certain extent with a rigidly mounted pinion but this variation of such distance is unimportant enough to be negligible in connection with the problem under consideration. The principal reason for difficulties is related to the variation of the tooth clearance. In spite of the greater accuracy required with the cycloid profile this type is the most used with peripheral drives as it is the cheapest to manufacture because the gear rim can be built up of cylindrical pins, and the invention will therefore be described with reference to the cycloidal profile.

A cycloid gear of the type under consideration has a single pressure line where the rolling circle and the pitch circle coincide and the profile of the tooth root thus limited to one point has been extended to a cylinder. However, with cycloid teeth the operating conditions of the wheels, must be carefully adjusted so that the rolling circles determined for manufacturing correspond to those obtained in practice as otherwise periodical faults in the gear ratio will occur in each tooth. Consequently, if this condition cannot be accomplished, an irregular drive obtained with corresponding wear will result.

The general object of the present invention is therefore to provide a new and improved arrangement of the gear mechanism with peripheral drive of the rotor of a heat exchanger so that the disadvantages of periodical faults and the like are practically eliminated and the wear brought down to a minimum.

For obtaining these and other objects which will be described in the following more in detail, the invention relates to a device for maintaining a constant tooth clearance independent of the ovality or deformation of the rotor. In the accompanying drawings some suitable embodiments are illustrated by way of example.

Figure 1:
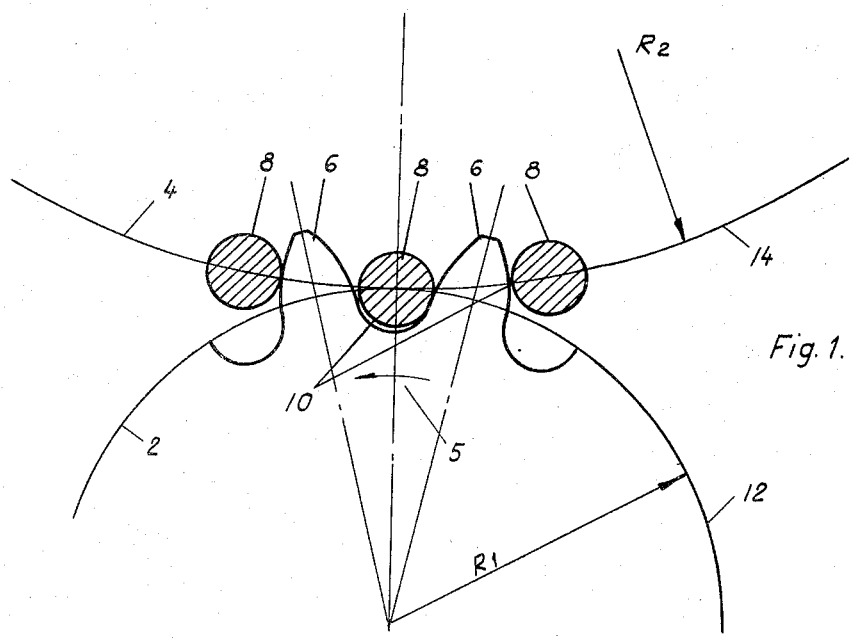
Fig. 1 is a diagrammatic view of gearing of the kind under consideration employing a gear of cycloid type.

In Fig. 1 the numeral 2 designates the pitch circle of the pinion and 4 the rolling circle of the pin toothed rim. The radii of these circles are designated at $R_1$ and $R_2$ respectively. The pinion is presumed to move in the direction of the arrow 5. Between the cycloid teeth 6 and the cylindrical pins 8 is a clearance 10 which is maintained constant by means of a cylindrical surface 12, provided on the pinion and concentric with the shaft of the pinion and having a radius $R_1$, arranged to roll on another cylindrical surface 14, provided concentrically on the rim and having a radius $R_2$, the pinion being pressed to the toothed wheel, for instance, by means of spring actuated members. Thus two cylindrical surfaces, which coincide with the pitch circles and the tooth clearance established, for example, when the gearing is manufactured, cannot be decreased or increased during operation even if the value of $R_2$ changes because of variations in the temperature of the rotor.

Figure 2:
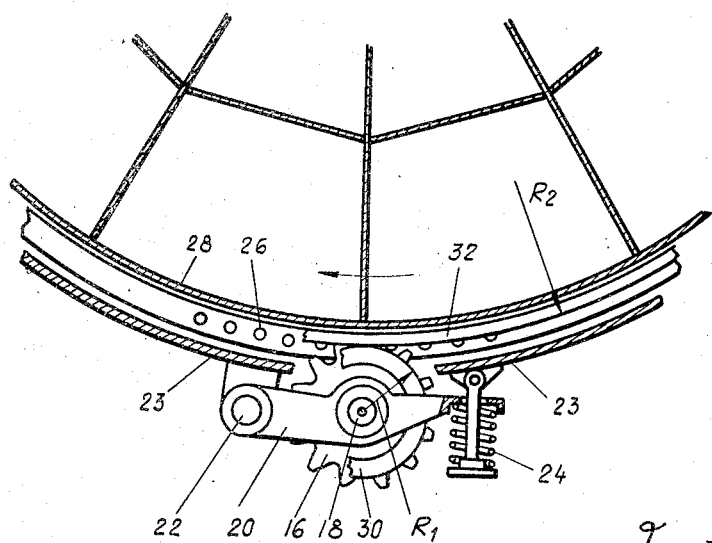
Fig. 2 is a fragmentary view of a rotor of a preheater and a gear mechanism embodying the invention.

Fig. 2 shows by way of example a device for supporting the pinion 16. The shaft 18 of this pinion is secured to a carrier arm 20 pivotally mounted on a pin 22 which is journalled in the rotor housing 23. The arm 20 is pressed towards the pin toothed rim 26 by means of a spring actuated device 24, which also is secured to the rotor housing 23, the rim being mounted on the rotor. On the pinion is provided a cylindrical surface or a wheel 30 having the radius $R_1$, which can roll on another cylindrical surface or ring 32 having the radius $R_2$, which ring is secured to the pin toothed rim 26 or to the rotor 28. By means of this arrangement the tooth clearance may be maintained constant and the meshing gear wheels, that is the pinion 16 and the rim 26, will during operation be held at such a distance from each other that periodical faults in the gear ratio for each tooth are practically eliminated.

Figure 3:
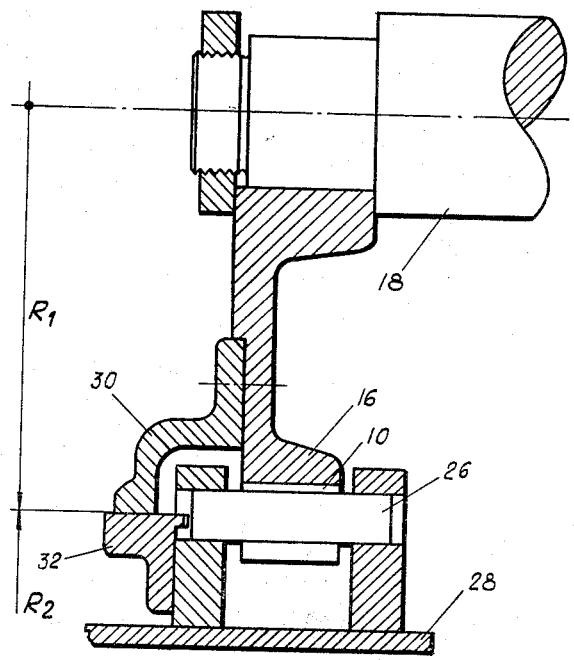
Figs. 3 and 4 show in section two different embodiments of gear embodying the invention.

Fig. 3 shows by way of example a section of the gear shown in Fig. 2. In the first mentioned figure the wheel 30 is formed like a ring which is concentrically mounted on the pinion 16. The ring 32 is likewise concentrically mounted on the rim 26.

Figure 4:
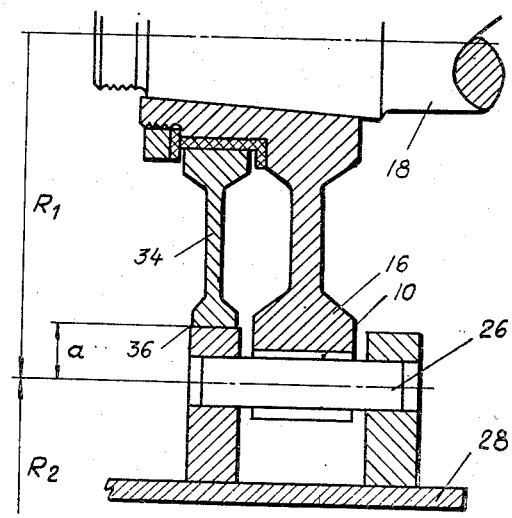

Fig. 4 shows by way of example another embodiment of the gear. A wheel 34 having the radius $R_1-a$ is concentrically mounted on the shaft 18 and may rotate independent of the pinion 16. The wheel 34 rolls on the cylindrical surface or ring 36, the radius of which is $R_2+a$. The pinion 16 and the wheel 34 are supported in the same way as shown in Fig. 2 so that a definite spring force holds the wheel 34 in contact with the ring 36, whereby the same effect is obtained as with the device according to Fig. 3, that is the clearance of tooth 10 is maintained constant.

The invention is of course not limited to the embodiments as shown and described, but may be varied in several ways within the scope of the invention.

What is claimed is:

1. In a gearing, a driving gear, a driven gear meshing therewith, and means providing two circular surfaces concentric respectively with the axes of said gears and arranged to abut to determine the meshing depth of the teeth of said gears, means for yieldably biasing the axis of one of said gears toward the axis of the other gear to maintain said surfaces in contact, said means including an element concentric with one of said gears and relatively rotatable with respect to both of said gears for providing one of said surfaces.

2. A gear as defined in claim 1 in which one of said gears is of substantially greater diameter than the other and said element is concentric with the smaller gear.

3. Gearing as defined in claim 2 in which said element and said smaller gear are mounted to turn about an axis movable toward and away from the axis of the larger gear and in which said yieldable biasing means acts to move the axis of said smaller gear.

References Cited in the file of this patent

UNITED STATES PATENTS

| Number | Name | Date |
|---|---|---|
| 622,758 | Crutchfield | Apr. 11, 1899 |
| 1,847,611 | Rodgkinson | Mar. 1, 1932 |
| 1,914,797 | Baker | June 20, 1933 |
| 2,045,753 | Carrington | June 30, 1936 |
| 2,605,646 | Karlsson et al. | Aug. 5, 1952 |

FOREIGN PATENTS

| Number | Country | Date |
|---|---|---|
| 697,258 | Germany | Oct. 9, 1940 |